US009322350B2

(12) United States Patent
Storhok et al.

(10) Patent No.: US 9,322,350 B2
(45) Date of Patent: *Apr. 26, 2016

(54) METHOD FOR COMPENSATING AN OPERATING IMBALANCE BETWEEN DIFFERENT BANKS OF A TURBOCHARGED ENGINE (75) Inventors: Eric Matthew Storhok, Ann Arbor, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

This patent is subject to a terminal disclaimer.

(21) Appl. No.: 13/610,736

(22) Filed: Sep. 11, 2012

(65) Prior Publication Data
US 2013/0032105 A1    Feb. 7, 2013

Related U.S. Application Data (60) Continuation of application No. 13/450,197, filed on Apr. 18, 2012, now Pat. No. 8,271,182, which is a division of application No. 11/777,644, filed on Jul. 13, 2007, now Pat. No. 8,209,109.

(51) Int. Cl.
F02B 29/04 (2006.01)
F02D 41/00 (2006.01)
F02D 41/14 (2006.01)

(52) U.S. Cl.
CPC ........ F02D 41/0082 (2013.01); F02D 41/0007 (2013.01); F02D 41/0085 (2013.01); F02D 41/1448 (2013.01); F02D 2041/001 (2013.01); Y02T 10/144 (2013.01)

(58) Field of Classification Search
CPC .......... F02D 2041/001; F02D 41/0007; F02D 13/0261; F02D 41/1448; F02D 2250/18; F02D 13/0215; F02D 13/0253; F02D 13/0265; F02D 13/0207; Y02T 10/144; Y02T 10/18; Y02T 10/42; F01N 13/107; F02M 25/0752; F02B 37/00
USPC ........ 60/612, 602, 605.1, 601, 603, 600, 559; 123/562, 198 F, 198 DB, 90.13, 90.15, 123/90.17, 90.11; 701/105, 112
See application file for complete search history.

(56) References Cited

U.S. PATENT DOCUMENTS

| | | | |
|---|---|---|---|
| 4,683,857 A | 8/1987 | Yasuoka | |
| 4,981,017 A | 1/1991 | Hara et al. | |
| 5,064,423 A | 11/1991 | Lorenz et al. | |
| 5,090,204 A | 2/1992 | Bonitz et al. | |
| 5,845,495 A | 12/1998 | Schray et al. | |
| 6,035,640 A * | 3/2000 | Kolmanovsky et al. | 60/605.2 |
| 6,158,218 A | 12/2000 | Herold et al. | |
| 6,202,414 B1 | 3/2001 | Schmidt et al. | |

(Continued)

OTHER PUBLICATIONS

US 6,754,575, 06/2004, Buckland et al. (withdrawn)

Primary Examiner — Jesse Bogue
Assistant Examiner — Thomas Olszewski
(74) Attorney, Agent, or Firm — Julia Voutyras; Alleman Hall McCoy Russell & Tuttle LLP (57) ABSTRACT A method for controlling differences in cylinder mixtures for a two cylinder bank engine having a turbocharger is presented. In one example, the description includes a method for adjusting valve timing to reduce cylinder mixture variation.

14 Claims, 5 Drawing Sheets

(56) References Cited

U.S. PATENT DOCUMENTS

| | | | |
|---|---|---|---|
| 6,276,138 B1 | 8/2001 | Welch | |
| 6,318,083 B1 | 11/2001 | Machida et al. | |
| 6,554,088 B2 | 4/2003 | Severinsky et al. | |
| 6,874,463 B1 | 4/2005 | Bolander et al. | |
| 6,968,677 B2 * | 11/2005 | Tamura | 60/277 |
| 6,968,689 B2 * | 11/2005 | Bleile et al. | 60/612 |
| 7,028,678 B2 | 4/2006 | Betz et al. | |
| 7,076,955 B2 | 7/2006 | Herz et al. | |
| 7,128,052 B1 * | 10/2006 | Reed et al. | 123/90.15 |
| 7,167,792 B1 * | 1/2007 | Kolmanovsky et al. | 701/112 |
| 7,181,332 B1 | 2/2007 | Vick et al. | |
| 7,184,879 B1 * | 2/2007 | Lewis | 701/112 |
| 7,380,447 B2 | 6/2008 | Rollinger et al. | |
| 7,415,345 B2 * | 8/2008 | Wild | 701/103 |
| 7,458,346 B2 | 12/2008 | Gibson | |
| 7,469,687 B2 * | 12/2008 | Mai et al. | 123/520 |
| 7,606,651 B2 * | 10/2009 | Kojima et al. | 701/102 |
| 7,621,126 B2 * | 11/2009 | Kolmanovsky et al. | 60/600 |
| 7,640,744 B2 | 1/2010 | Rollinger et al. | |
| 7,734,409 B2 | 6/2010 | Uitenbroek | |
| 7,770,393 B2 | 8/2010 | Buckland et al. | |
| 7,801,665 B2 | 9/2010 | Buckland et al. | |
| 7,987,040 B2 | 7/2011 | Buckland et al. | |
| 8,001,782 B2 | 8/2011 | Pursifull | |
| 8,180,553 B2 | 5/2012 | Buckland et al. | |
| 8,209,109 B2 * | 6/2012 | Storhok et al. | 701/105 |
| 8,271,182 B2 * | 9/2012 | Storhok et al. | 701/105 |
| 2004/0016419 A1 | 1/2004 | Satou et al. | |
| 2005/0172628 A1 | 8/2005 | Fukasawa et al. | |
| 2007/0234984 A1 | 10/2007 | Kolmanovsky et al. | |
| 2008/0190405 A1 * | 8/2008 | Eser et al. | 123/90.15 |
| 2009/0013945 A1 | 1/2009 | Buckland et al. | |
| 2009/0018751 A1 | 1/2009 | Buckland et al. | |
| 2009/0018756 A1 | 1/2009 | Storhok et al. | |
| 2010/0011762 A1 * | 1/2010 | Hokuto et al. | 60/602 |
| 2011/0000448 A1 | 1/2011 | Buckland et al. | |

* cited by examiner

METHOD FOR COMPENSATING AN OPERATING IMBALANCE BETWEEN DIFFERENT BANKS OF A TURBOCHARGED ENGINE

CROSS REFERENCE TO RELATED APPLICATIONS

The present application is a continuation of U.S. patent application Ser. No. 13/450,197 filed Apr. 18, 2012, now U.S. Pat. No. 8,271,182, which is a divisional of U.S. patent application Ser. No. 11/777,644 filed Jul. 13, 2007, now U.S. Pat. No. 8,209,109 issued on Jun. 26, 2012, the entire contents of each of which are incorporated herein by reference for all purposes.

FIELD

The present description relates to a method for controlling the cylinder air charge of an internal combustion engine having a turbocharger and a variable event valvetrain.

BACKGROUND

One method to operate an internal combustion engine having a turbocharger is presented in U.S. Pat. No. 5,845,495. This method presents a way to balance the output of two turbochargers that are in communication with different cylinder banks of a "V" engine. The method uses a pressure transducer to determine if a pressure differential exists between the engine's exhaust manifolds. If a pressure differential is present, the method can open a waste gate, deactivate fuel injection, or limit the throttle valve opening in an attempt to equalize cylinder backpressure.

The above-mentioned method can also have several disadvantages. For example, the method is not capable of compensating for cylinder charge variations that can occur when a single turbocharger is used to supply compressed air to two different cylinder banks. Since the method relies on making adjustments to the waste gates of two independent turbochargers, it is not capable of compensating for back pressure variations that may occur in single turbocharger applications. Further, in dual turbocharger applications, the method does not have the capacity to compensate for cylinder breathing differences that may occur between different cylinder banks. That is, the method simply adjusts cylinder back pressure without considering that the cylinder charge contents may also be different from cylinder bank to cylinder bank. For example, differences in valve timing between cylinder banks may result in a condition where the cylinder back pressure between two cylinder banks is nearly equal; however, the cylinders of one cylinder bank may be inducting more fresh air than the other cylinder bank. Consequently, there may be a torque imbalance between the two cylinder banks.

The inventors herein have recognized the above-mentioned disadvantages and have developed a method to control an engine having variable event valve operation and a turbocharger.

SUMMARY

One embodiment of the present description includes a method for controlling an internal combustion engine, the method comprising: varying valve operation of at least a cylinder in a second group of cylinders as exhaust pressure varies between said second group of cylinders and a first group of cylinders, said first group of cylinders in communication with a first turbocharger. This method overcomes at least some of the limitations of the previously mentioned methods.

Variable valve operation provides a means for balancing mixtures between cylinder banks of an engine having different backpressures between cylinder banks. And, variable valve timing provides a means for normalizing cylinder charges between cylinder banks even when the cylinder banks are configured differently. For example, an eight cylinder engine that has two cylinder banks, four cylinders per bank, can be provided with a single turbocharger and variable valve timing. The valve operation of intake and/or exhaust valves of the cylinder banks can be adjusted independently so that variation in cylinder contents between the cylinder banks is reduced. That is, the intake and/or exhaust valve timing of one or both cylinder banks can be adjusted so that differences between the residual gas fraction and/or inducted air charge of different cylinder banks is reduced. Alternatively, the intake and/or exhaust valve lift may be adjusted to compensate for differences between cylinder banks. Thus, different valve operations for each cylinder bank can be used to mitigate the effects of placing a turbocharger downstream of a single cylinder bank. Likewise, variable valve timing can also be applied to engine systems that utilize two or more turbochargers so that bank-to-bank cylinder mixture variation is reduced. Independent cylinder bank valve control makes it possible to uniquely control the intake and exhaust valve overlap as well as valve opening/closing positions such that each cylinder bank is adjusted to account for turbocharger and engine breathing differences (i.e., valve timing can be used to mitigate, at least to some extent, flow restriction differences between cylinder banks).

The present description may provide several advantages. Specifically, variations in cylinder mixtures between cylinder banks can be reduced by the present method. Specifically, residuals (i.e., combusted gases) and fresh air charge can be equalized between different cylinder banks having different exhaust manifold backpressures. This can improve engine emissions because cylinder exhaust gas residuals can be controlled even when there are exhaust backpressure differences between cylinder banks. The system and method also provide unexpected results. For example, more uniform cylinder mixtures can improve equalization of engine torque between cylinder banks. Further, exhaust gases flowing to a turbocharger can be controlled at conditions where there is a low turbocharger compressor flow rate so that compressor surge can be mitigated where a waste gate is inoperable. By recognizing that valve operation can be varied to improve turbocharger operation, the inventors herein can realize the above-mentioned advantages, at least during some conditions.

The above advantages and other advantages and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
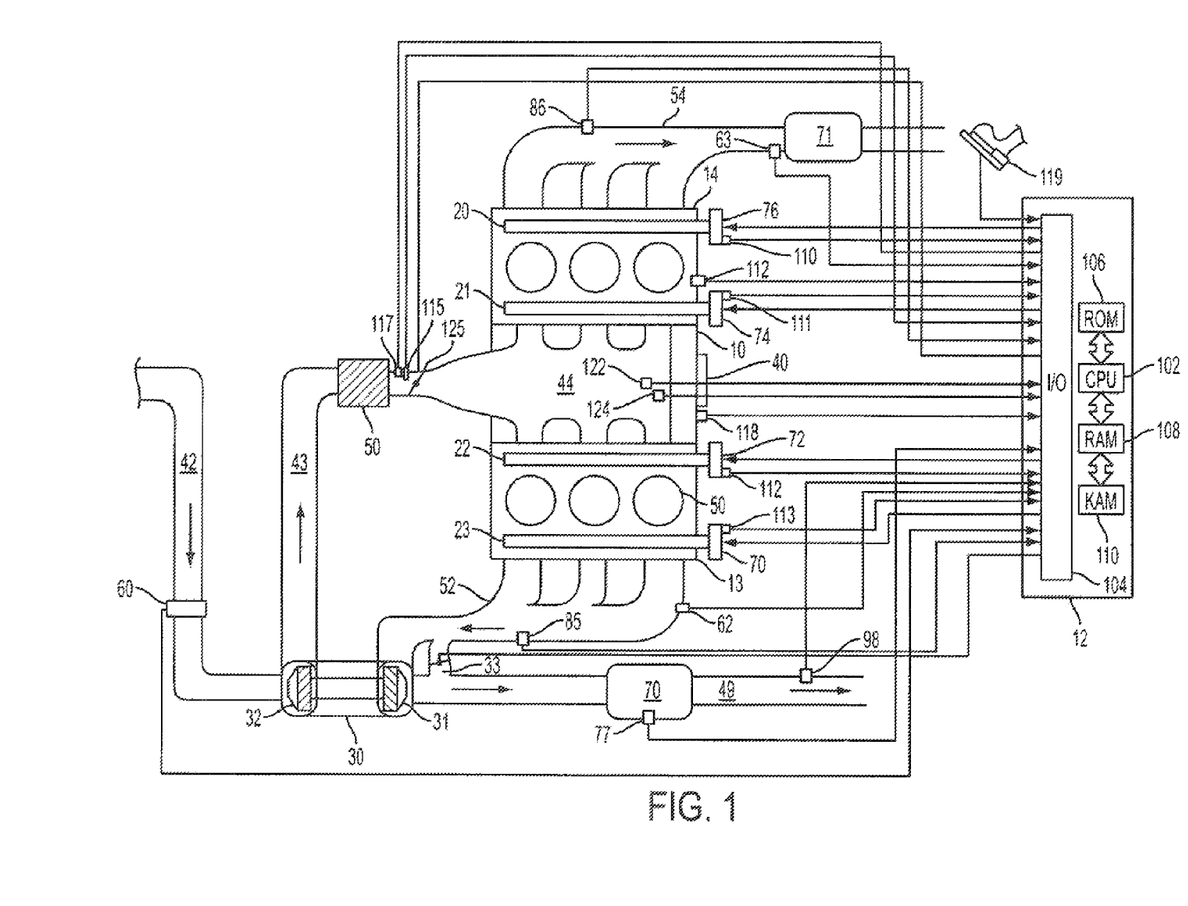
FIG. 1 is a schematic diagram of a turbocharged engine.

Referring to FIG. 1, internal combustion engine 10 is controlled by electronic engine controller 12. Engine 10 includes a plurality of cylinders in a "V" configuration that are similar to cylinder 50. Cylinder banks 13 and 14 are comprised of three cylinders each. Intake cams 21 and 22 operate intake valves (not shown) to regulate air flow into the cylinders of banks 14 and 13. Exhaust cams 20 and 23 operate exhaust valves (not shown) to regulate exhaust flow out of cylinder banks 14 and 13. Timing of intake and exhaust cams relative to crankshaft position can be varied by adjusting phasors 76, 74, 72, and 70. Alternatively, one or more intake or exhaust valves may be operated without assistance from a mechanical cam (e.g., electrically or hydraulically actuated valves). Further, intake and/or exhaust valves may be configured to vary valve lift. Each cylinder surrounds a piston that transfers combustion energy to mechanical energy through crankshaft 40. Intake manifold 44, in communication with electronically controlled throttle 125, directs air to cylinder banks 13 and 14. Intake air is routed through duct 42 and mass air flow sensor 60 before being compressed by turbocharger 30. Compressed air is routed through duct 43 to intercooler 50, upstream of electronic throttle 125. Combusted gases exit cylinder banks 13 and 14 through exhaust manifolds 52 and 54. Exhaust gases rotate turbine 31 of turbocharger 30, turbine 31 causes compressor 32 to rotate and compress fresh air. Waste gate 33 allows exhaust gases to bypass turbine 31 so that turbine flow and compressor flow can be controlled. Alternatively, turbine 31 may have adjustable vanes that allow the compressor and turbine flows to be controlled.

Distributorless ignition system (not shown) provides ignition spark to the cylinders of banks 14 and 13. Universal Exhaust Gas Oxygen (UEGO) sensors 85 and 86 are shown coupled to exhaust manifolds 52 and 54 upstream of catalytic converters 70 and 71. Alternatively, a two-state exhaust gas oxygen sensors may be substituted for UEGO sensors 85 and 86. Two-state exhaust gas oxygen sensor 98 is shown coupled to exhaust pipe 49 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor (not shown); a position sensor 119 coupled to an accelerator pedal; a measurement of engine manifold pressure (MAP) from pressure sensor 122 coupled to intake manifold 44; crankshaft position 118; camshaft positions 110-113; boost air pressure 115; boost air temperature 117; exhaust manifold pressure 62-63; and a measurement (ACT) of engine air amount temperature or manifold temperature from temperature sensor 124. Furthermore, controller 12 can estimate some engine conditions without directly measuring the conditions. For example, it is possible to estimate exhaust system pressure instead of measuring exhaust pressure using cylinder flow rates and turbocharger waste gate position. Thus, it may be desirable to estimate some engine conditions and eliminate a sensor rather than adding sensors to the engine system.

The engine described in FIG. 1 may be the primary means of generating motive force in a vehicle or it may be part of a vehicle having more than one means for generating motive force, a hybrid vehicle for example. The engine may generate wheel torque in conjunction with an electric motor when in a hybrid configuration. Alternatively, the engine may generate wheel torque in conjunction with a hydraulic motor. Thus, there are many configurations whereby features of the present description may be used to advantage.

Figure 2:
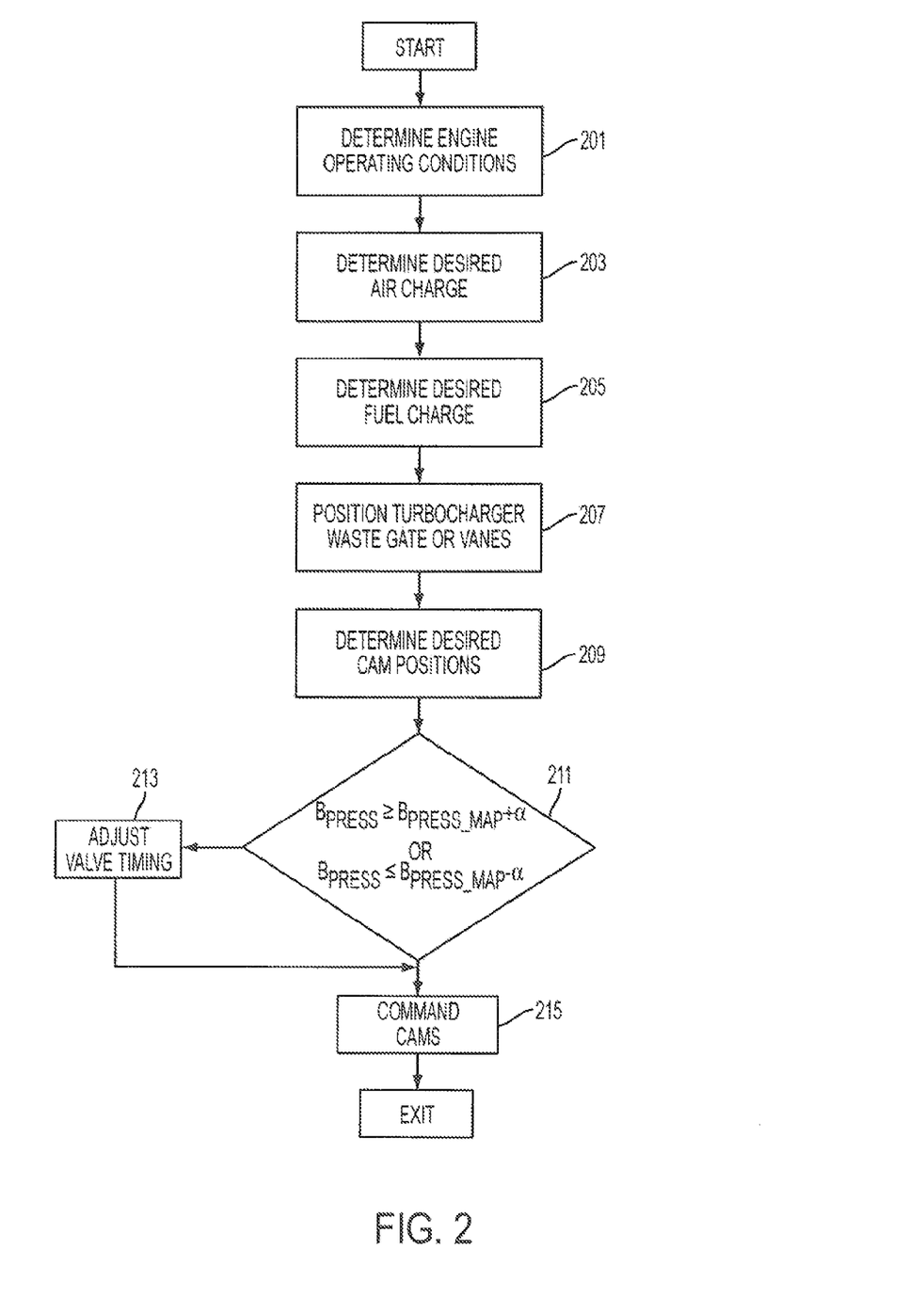
FIG. 2 is a flow chart of an example engine control strategy.

Referring now to FIG. 2, a flow chart of a method for reducing cylinder mixture variation for an engine having two cylinder banks and a single turbocharger is shown. Cylinder mixtures can vary from one engine cylinder bank to the other when there are differences between the flow paths leading into and out of cylinders. For example, if a turbocharger is placed in the exhaust path of one cylinder bank and the other bank has no turbocharger, then it is possible for cylinder mixture variations to occur between cylinder banks. The mixture variations between cylinder banks may consist of higher or lower concentrations of residual exhaust and/or an increase or decrease in cylinder air charge. The method described in FIG. 2 mitigates cylinder mixture differences between cylinder banks.

In step 201, the routine determines engine operating conditions. Engine operating conditions can be determined and/or monitored by sampling data from various vehicle and/or engine sensors shown, but not limited to those illustrated in FIG. 1. For example, engine temperature can be determined by sampling the output of an engine coolant temperature sensor. In addition, engine operating conditions can include, but are not limited to the pressure in the engine intake manifold, the air temperature in the engine intake manifold, the pressure in the engine exhaust manifolds, the temperature in the engine exhaust manifolds, the state of an engine exhaust gas oxygen sensors, the engine torque request, engine speed, and barometric pressure. After engine operating conditions are determined, the routine proceeds to step 203.

In step 203, the desired cylinder air charge is determined from the current engine speed and an operator torque request. The operator torque request may be determined from observing the position of an accelerator pedal, a lever, or from a signal produced by an external system (e.g., an analog or digital command from a hybrid vehicle controller). The torque request signal is transformed into a driver brake torque request by way of a two dimensional table that contains empirically determined engine speed data verses accelerator pedal position. When queried, the table outputs a desired driver brake torque. The desired driver brake torque is summed with the torque used to operate accessories and an estimate of engine pumping torque to calculate a desired engine brake torque. This is illustrated by the following equation:

$$\Gamma_{eng\_brake\_tor} = \Gamma_{driver} + \Gamma_{acc} + \Gamma_{pump}$$

where $\Gamma_{eng\_brake\_tor}$ is the requested engine brake torque, $\Gamma_{driver}$ is the requested or desired driver torque demand, $\Gamma_{acc}$ is the torque to power accessories (e.g., an air conditioning compressor), and $\Gamma_{pump}$ is the engine pumping torque. The requested engine brake torque and current engine speed are then used to index a table that outputs an engine load. The engine load is converted to a cylinder air charge by the following equation:

$$Cyl\_air\_chg = sarchg \cdot Load$$

where Cyl_air_chg is the desired air charge in a cylinder for a cycle of the cylinder, sarchg is the cylinder air charge capacity based on the cylinder volume at standard temperature and pressure, and load is a fractional number that represents an engine air capacity.

Figure 4A:
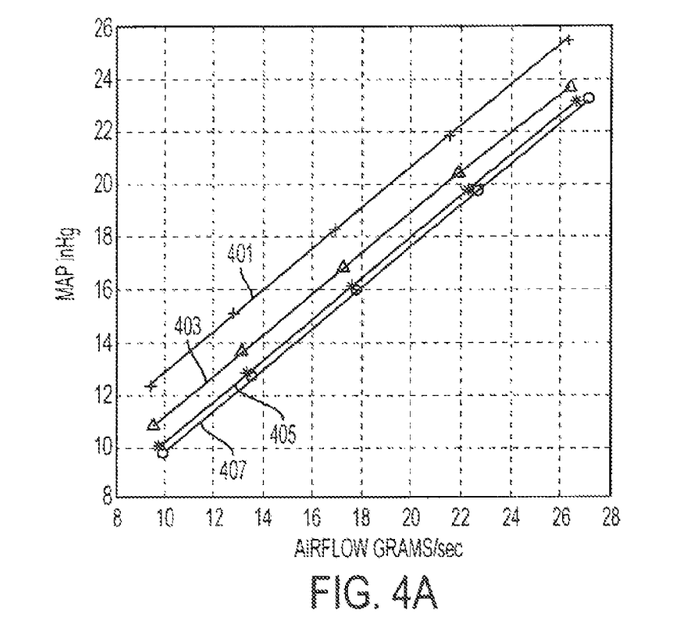
FIG. 4A is a plot of the effect of variable exhaust valve timing on cylinder air flow.
Figure 4B:
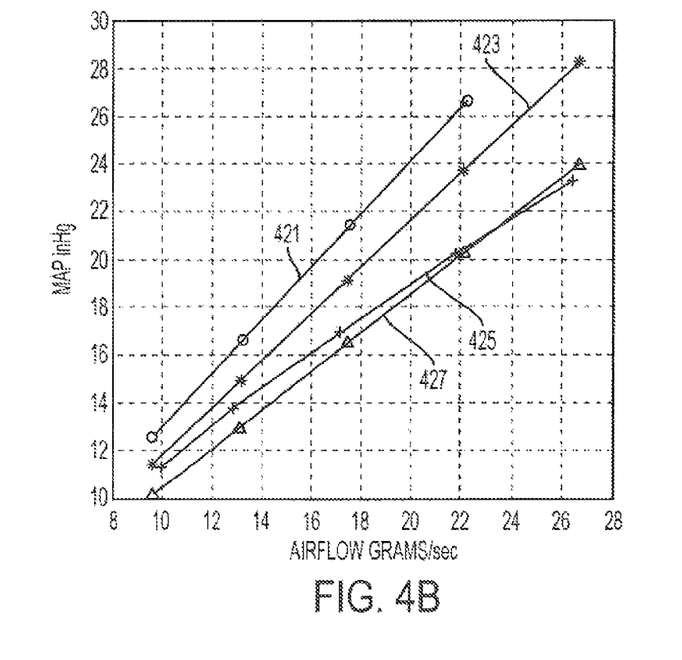
FIG. 4B is a plot of the effect of variable intake valve timing on cylinder air flow.
Figure 5:
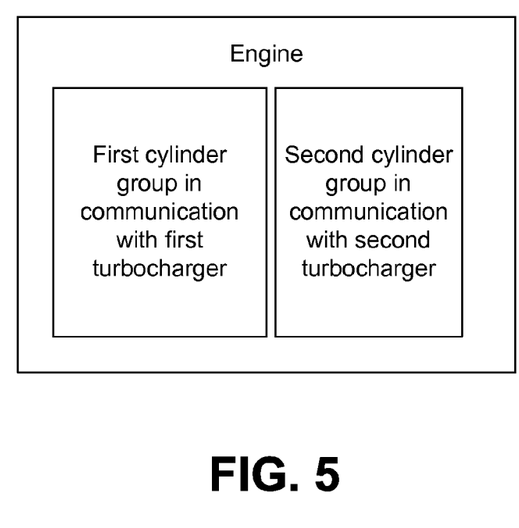
FIG. 5 shows an engine having first and second groups of cylinders, each in communication with a separate turbocharger. Specifically, the first group of cylinders is in communication with the first turbocharger of the engine while the seond group of cylinders is in communication with a second turbocharger of the engine.

The desired cylinder air charge can then be converted into an intake manifold pressure by using the relationship between cylinder air charge and intake manifold pressure. Specifically, in some variable cam configurations, a nearly linear relationship exists between cylinder air charge and intake manifold pressure, see FIGS. 4-5 for example, at a given engine speed and cam positions. A family of curves that are based on engine speed and cam positions can be stored that describe the relationship between cam positions, engine speed, cylinder air charge, and manifold pressure. These tables can be indexed by using the current engine speed, cam positions, and desired cylinder air charge to determine a desired intake manifold pressure. The desired intake manifold pressure is determined by interpolating between a limited number of empirical curves that describe cylinder air charge in relation to cam positions and intake manifold pressure. In other variable cam configurations, a quadratic relationship exists between intake manifold pressure and cylinder air flow. In these cases, it is possible to solve the roots of the equation and obtain an equation that outputs manifold pressure as a function of cylinder air charge at given cam positions. U.S. patent application Ser. No. 11/423,433 describes the relationship between cylinder air charge and manifold pressure and is hereby fully incorporated by reference for all intents and purposes.

The desired manifold pressure is achieved by setting the position of the throttle plate to match the desired cylinder air flow. Specifically, the throttle position is set based on the desired pressure ratio across the throttle (i.e., the pressure ratio between desired manifold pressure and throttle inlet pressure) and a throttle angle that produces the desired flow at the desired pressure ratio across the throttle. If desired, the throttle plate position can be adjusted further using a proportional/integral controller that moves the throttle plate based on feedback from a manifold pressure sensor. The routine proceeds to step 205.

In step 205, the desired fuel mass charge is determined. The cylinder air charge mass is multiplied by the desired air-fuel ratio to determine the desired fuel mass. The routine proceeds to step 207.

In step 207, the turbocharger waste gate position or vane position is set. Engine speed and desired engine load are used to index a table that outputs a desired waste gate position. The waste gate position can be further adjusted for an inlet pressure error (i.e., the desired inlet pressure minus the actual inlet pressure) by adjusting the waste gate position in response to the inlet pressure error. In one example, a proportional/integral controller can be used to make waste gate adjustments based on the inlet pressure error. The routine continues to step 209.

In step 209, the open-loop camshaft positions or valve timings are determined. Alternatively, valve lifts may be determined in this step in substantially the same manner, i.e., by indexing predetermined tables and/or functions. Engine speed and desired engine torque are used to index tables that output empirically predetermined cam positions or valve timings for each cylinder bank. For an engine having two cylinder banks and a single turbocharger in the exhaust path of one cylinder bank, overlap between intake and exhaust valves is increased as engine flow increases for the cylinder bank that does not have a turbocharger in its exhaust path. This increases the cylinder's residual mass fraction to account for the increased cylinder back pressure of the cylinder bank having a turbocharger in its exhaust path. The cams positions or valve timings can be adjusted such that variation of cylinder mixtures between cylinder banks is reduced. The particular cam timings or valve timings used to reduce cylinder mixture variation can be empirically determined at steady state engine operating conditions during engine mapping. The routine proceeds to step 211.

In step 211, the routine determines whether or not to make cam position adjustments to correct for cylinder bank backpressure that may deviate from desired levels. For example, when an engine is operating at 1500 RPM, the backpressure of one or both cylinder banks can exceed the desired cylinder bank backpressure by some amount. As such, the cam and/or valve timing of one or both cylinder banks can be adjusted to reduce variations in cylinder mixtures between the cylinder banks, thereby mitigating the effects of exhaust backpressure variation.

To determine whether or not cam adjustments are desired, a comparison is made between the actual or estimated cylinder backpressure and a predetermined backpressure. The predetermined backpressure can include an offset that allows some variation from the nominal backpressure without requiring cam timing changes. This can act to reduce the busyness of cam adjustments. However, if the actual or estimated cylinder backpressure is greater than or less than the predetermined pressure and offset, then the routine proceeds to step 213. Otherwise, the routine proceeds to step 215. In particular, the following equations are one example used to determine whether or not to make cam timing adjustments:

$$B_{press} \geq B_{press\_map} + \alpha$$

or $$B_{press} \leq B_{press\_map} - \alpha$$

where $B_{press}$ is the actual or estimated exhaust backpressure, $B_{press\_map}$ is the exhaust backpressure for the current engine operating conditions that was observed during engine mapping, and $\alpha$ is a calibration constant that can be used to limit cam timing adjustments when there are small deviations in exhaust backpressure. If either of the above two conditions are met, the routine proceeds to step 213.

Alternatively, in some applications, compressor surge can be predicted from the compressor pressure ratio. When surge conditions are present or just prior to surge conditions, valve operation can be adjusted to lower the exhaust flow rate to the turbocharger compressor, thereby reducing the compressor flow. Valve adjustments for surge conditions can be determined from look-up tables or functions that are indexed by engine speed and load, for example. In one embodiment, the exhaust cam of a cylinder bank is retarded to reduce the engine volumetric efficiency and the cylinder flow rate.

In step 213, cam or valve timing adjustments are made to the base timings determined in step 209.

It is anticipated that various engine system configurations are possible. For example, an engine may be configured to have intake only valve timing adjustments, exhaust only valve timing adjustments, intake and exhaust valve timing adjustments, or fully independent intake and/or exhaust valve adjustments (e.g., electrically actuated valves). Accordingly, the methods to adjust cam, valve timings, or valve lift can vary somewhat between configurations.

In one engine system configuration, where one cylinder bank of a two cylinder bank engine has a turbocharger installed in the exhaust system, cylinder backpressure variations in the cylinder bank having a turbocharger are used to adjust cam or valve timings (intake and/or exhaust valve timings) relative to the crankshaft position for the opposite cylinder bank. That is, as exhaust back pressure deviates from desired exhaust back pressure in the cylinder bank having a turbocharger turbine in the exhaust path, cam or valve timing adjustments are made to all cylinders of the cylinder bank that does not have a turbocharger in its exhaust path. Note, however, that it is also possible to adjust the cam or valve timing for the cylinder bank that has a turbocharger in its exhaust path when the exhaust pressure in its exhaust manifold deviates from a desired exhaust manifold pressure. Further, it's possible to adjust cam or valve timing for both cylinder banks when the exhaust backpressure of the cylinder bank having a turbocharger in its exhaust path changes from a desired value.

In one example cam or valve adjustment procedure, a comparison can be made between the desired exhaust pressure and the estimated or actual exhaust pressure by subtracting the actual exhaust pressure from the desired exhaust pressure. This calculation determines the error in exhaust pressure, and the exhaust pressure error is used to determine the desired cam or valve timing adjustments or valve lift adjustments. In particular, three dimensional tables for each cam to be adjusted are populated with empirically determined cam advance or retard amounts or lift amounts that are added to the base cam timings or lift amounts determined in step 209. The tables are indexed by engine speed, engine torque demand, and exhaust pressure error. In this configuration, where a single turbocharger is used to provide compressed air to two cylinder banks, the exhaust pressure error (i.e., the difference in pressure between the desired exhaust pressure and the actual or estimated exhaust pressure) in the cylinder bank having a turbocharger is used to index the cam adjustments of the other cylinder bank. For example, an exhaust pressure increase of 20 KPa in the cylinder bank having a turbocharger in its exhaust stream can cause the opposite cylinder bank intake cam to be retarded by five crankshaft angle degrees.

In one embodiment where the exhaust valve closing time is after top-dead-center intake stroke, the exhaust valve timing of a cylinder bank without a turbocharger turbine in the exhaust path can be retarded so that the overlap time between open intake valves and open exhaust valves increases, thereby increasing the exhaust gas residuals. Thus, the residuals of the cylinder bank without a turbine in the exhaust path are increased to match the cylinder bank having the turbine in the exhaust path.

In another embodiment where the exhaust valves of a cylinder bank without a turbocharger turbine in the exhaust path are closed before top-dead-center intake stroke, the exhaust valve opening time can be advanced to trap more exhaust residuals in the cylinder. Similar to the previous embodiment, the residuals of the cylinder bank without a turbine in the exhaust path are increased to match the cylinder bank having the turbine in the exhaust path.

In still another embodiment, the valve timing of the cylinder bank having a turbine in the exhaust path can be adjusted to decrease the overlap time between open intake valves and open exhaust valves of the cylinder bank having a turbine in the exhaust path. This action can be used to limit the residuals when engine flow (i.e., the amount of gasses passing through an engine) and exhaust backpressure are increasing.

In an alternative configuration, where valves can be operated without a camshaft, similar three dimensional tables can be used to provide adjustments to intake and/or exhaust valve opening and closing times. Additionally, if desired, the same pressure error can be used to adjust the cam timings of the cylinder bank having the turbocharger in the exhaust stream. The cam timing adjustment tables are populated with cam timing adjustments that are based on cam positions that reduce cylinder bank to cylinder bank mixture variations when exhaust backpressure deviates from the nominal value that resulted from the cam timings determined in step 209. After adjusting the desired cam or valve timings, the routine continues to step 215.

In Addition to adjusting cam or valve timing, spark timing can also be adjusted as a function of the exhaust pressure error. Similar, to the cam timing adjustment tables, three dimensional tables can adjust spark timing for each cylinder bank as a function of the exhaust pressure error. The spark adjustment tables (one for each cylinder bank) can be indexed by engine speed, desired engine load, and exhaust pressure error. The table output is added to the base spark timing to account for a change in cylinder exhaust gas residuals.

Throttle adjustments may also be made in conjunction with cam or valve timing/lift adjustments. In one example, when there is a difference in exhaust backpressure between different cylinder banks, the throttle position can be adjusted to compensate for cam adjustments. For example, if valve timing/lift adjustments increase the amount of air entering a cylinder, throttle position can be adjusted by an amount that reduces the intake manifold pressure so that the desired engine torque is maintained. The throttle adjustment may be made in predetermined increments or the throttle adjustments may be made based on the throttle flow characteristics and/or intake manifold pressure.

In an alternate example cam adjustment procedure, a change in exhaust manifold pressure can be input into a geometric model that determines cylinder exhaust gas residuals and cylinder fresh air (see U.S. Pat. No. 6,754,575 which is hereby fully incorporated by reference for all intents and purposes for example). The base cam timings are empirically determined during engine mapping in response to fuel consumption and combustion characteristics. These cam timings produce cylinder mixtures having exhaust gas residuals and fresh air charges that are treated as base values. When an increase in cylinder backpressure of a cylinder bank having a turbocharger in the exhaust path changes the exhaust gas residual fraction in a cylinder, the valve timings of the other cylinder bank are adjusted to reduce the mixture variations between the cylinder banks. In one example of geometric based cam adjustments, the overlap between the intake and exhaust valves is increased so that the residual gas fraction in the cylinder bank without a turbocharger in the exhaust path matches the cylinder bank having a turbocharger in the exhaust gas path. The specific revised valve timings are determined by solving the geometric equations for an exhaust gas residual that matches the exhaust gas residual in the cylinder bank have a turbocharger in its exhaust gas path.

In step 215, the desired cam positions or lift amounts are output to actuators. The camshaft angular position with respect to crankshaft timing is converted into duty cycle signals that cause the cam actuators to advance or retard through the control of oil flow to the cam phase actuator. The camshaft phase angle controller may simply output commands from steps 209 and 213 that position the camshaft in an open loop manner, or the controller may utilize camshaft position feedback and a proportional/integral position controller. Valve lift amounts are similarly processed. In addition, the fuel amount determined in step 205 can be updated for changes in valve operation that can affect the cylinder flow. The routine exits after commanding the cams to the desired position.

Figure 3:
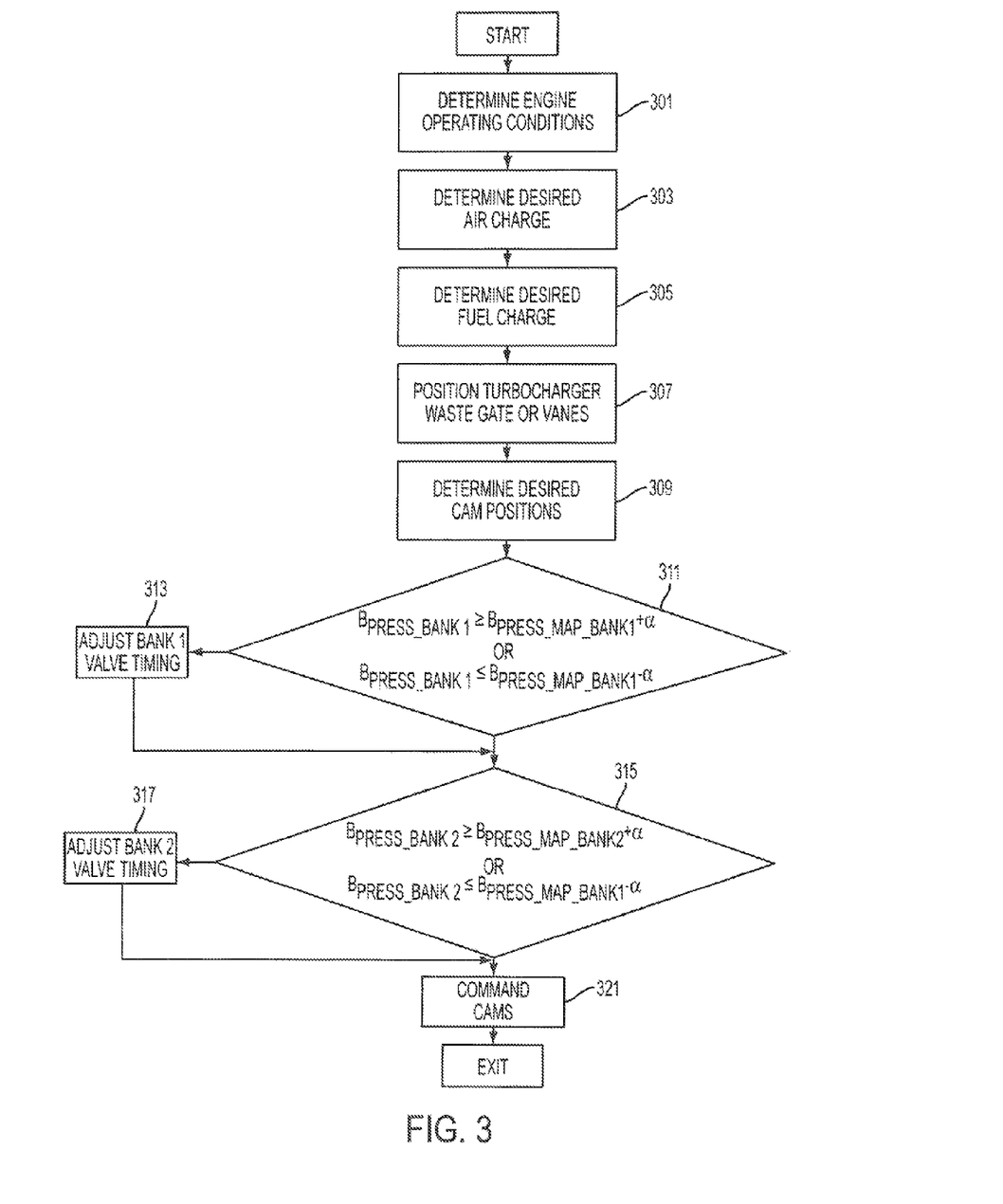
FIG. 3 is a flow chart of an alternate engine control strategy.

Referring now to FIG. 3, a flow chart for a method of reducing cylinder mixture variation for an engine having two cylinder banks and two turbochargers is shown. Steps 301-307 are the same as those described in steps 201-207 of FIG. 2. As such, the description of steps 301-307 has been omitted to reduce redundancy.

In step 309, the open-loop camshaft positions or valve timings are determined. Engine speed and desired engine torque are used to index tables that output empirically predetermined cam positions or valve timings for each cylinder bank. In one example, where both cylinder banks have a turbocharger of equal size, the base cam positions are set so that the cam positions for both cylinder banks are substantially equal. In still another example, where a smaller turbocharger is fitted to the exhaust of one cylinder bank, and where a larger turbocharger is fitted to the exhaust of the other cylinder bank, the cams may be positioned differently to account for cylinder bank backpressure differences between the cylinder banks. Specifically, the cams positions can be adjusted such that variation of cylinder mixtures between cylinder banks is reduced. The particular cam timings used to reduce cylinder mixture variation can be empirically determined at steady state engine operating conditions during engine mapping. The routine proceeds to step 311.

In step 311, the routine determines whether or not to make cam position or valve timing adjustments to correct for backpressure at cylinder bank number one that may deviate from desired levels. To determine whether or not cam adjustments are desired, a comparison is made between the actual or estimated backpressure of cylinder bank number one and a predetermined backpressure for cylinder bank number one. The predetermined cylinder bank number one backpressure can include an offset that allows some variation from the nominal backpressure without forcing cam timing changes. If the actual or estimated cylinder backpressure is greater than or less than the predetermined pressure and offset, then the routine proceeds to step 313. Otherwise, the routine proceeds to step 315. In particular, the following equations are one example used to determine whether or not to make cam timing adjustments:

$$B_{press\_bank1} \geq B_{press\_map\_bank1} + \alpha$$

or $$B_{press\_bank1} \leq B_{press\_map\_bank1} - \alpha$$

where $B_{press\_bank1}$ is the actual or estimated exhaust backpressure for cylinder bank number one, $B_{press\_map\_bank1}$ is the exhaust backpressure for the current engine operating conditions that was observed during engine mapping for cylinder bank number one, and a is a calibration constant that can be used to limit cam timing adjustments when there are small deviations in exhaust backpressure. If either of the above two conditions are met, the routine proceeds to step 313.

In step 313, cam adjustments are made to the base cam timings determined in step 309.

In this configuration, each cylinder bank of a two cylinder bank engine has a turbocharger installed in the exhaust path. If the exhaust backpressure of cylinder bank number one changes from the desired exhaust backpressure then the cam timing or valve timing of cylinder bank number one is adjusted. In one example cam adjustment procedure, a comparison can be made between the desired exhaust pressure and the estimated exhaust pressure by subtracting the actual exhaust pressure from the desired exhaust pressure. This calculation determines the error in exhaust pressure, and the exhaust pressure error is used to determine the desired cam timing or valve timing adjustments to cylinder bank number one. In particular, three dimensional tables for each cam to be adjusted are populated with empirically determined cam advance or retard amounts that are added to the base cam timing determined in step 309. The cam timing tables are indexed by engine speed, engine torque demand, and exhaust pressure error. Further, if desired, cam timing adjustments can be made to cylinder bank number two in response to the cylinder backpressure error determined from cylinder bank number one. Similarly, the exhaust back pressure error determined for cylinder bank number one is used to index three dimensional tables that provide adjustments to the base cylinder bank two cam timings determined in step 309. The adjustments are empirically determined during engine mapping. In alternative embodiments, where valves can be operated without a camshaft, similar three dimensional tables can be used to provide adjustments to intake and/or exhaust valve opening and closing times. The routine continues to step 315.

In step 315, the routine determines whether or not to make cam position adjustments to correct for backpressure at cylinder bank number two that may deviate from desired levels. To determine whether or not cam adjustments or valve timing adjustments are desired, a comparison is made between the actual or estimated backpressure of cylinder bank number two and a predetermined backpressure for cylinder bank number two. The predetermined cylinder bank number two backpressure can include an offset that allows some variation from the nominal backpressure without forcing cam timing changes. If the actual or estimated cylinder backpressure is greater than or less than the predetermined pressure and offset, then the routine proceeds to step 317. Otherwise, the routine proceeds to step 321. In particular, the following equations are one example used to determine whether or not to make cam timing adjustments:

$$B_{press\_bank2} \geq B_{press\_map\_bank2} + \alpha$$

or $$B_{press\_bank2} \leq B_{press\_map\_bank2} - \alpha$$

where $B_{press\_bank2}$ is the actual or estimated exhaust backpressure for cylinder bank number two, $B_{press\_map\_bank2}$ is the exhaust backpressure for the current engine operating conditions that was observed during engine mapping for cylinder bank number two, and α is a calibration constant that can be used to limit cam timing adjustments when there are small deviations in exhaust backpressure.

As discussed in FIG. 2, spark timing can also be adjusted as a function of the exhaust pressure error. If the exhaust backpressure of a cylinder bank deviates from the desired exhaust backpressure, spark is adjusted in the same cylinder bank to account for cylinder mixture changes in the exhaust gas residual and the air charge.

In step 321, the desired cam positions are output to the camshaft actuators. The camshaft angular position with respect to crankshaft timing is converted into duty cycle signals that cause the cam actuators to advance or retard through the control of oil flow to the cam phase actuator. The camshaft phase angle controller may simply output predetermined commands that position the camshaft or the controller may utilize camshaft position feedback and a proportional/integral position controller to adjust cam timing. In addition, the fuel amount determined in step 305 can be updated for changes in valve operation that can affect the cylinder flow. The routine exits after commanding the cams.

Referring now to FIG. 4A, a plot that illustrates the effect of variable exhaust valve timing on intake manifold pressure and cylinder air charge is shown. The data were generated at 1500 RPM. The Y-axis represents intake manifold absolute pressure (MAP) in units of inches of mercury. The X-axis represents the engine air flow in grams per second. Line 401 represents the relationship between intake manifold pressure and engine air flow when the intake valve opens at 10 degrees before top-dead-center intake stroke and the exhaust valve closes at 40 degrees after top-dead-center intake stroke. Line 403 represents the relationship between intake manifold pressure and engine air flow when the intake valve opens at 10 degrees before top-dead-center intake stroke and the exhaust valve closes at 30 degrees after top-dead-center intake stroke. Line 405 represents the relationship between intake manifold pressure and engine air flow when the intake valve opens at 10 degrees before top-dead-center intake stroke and the exhaust valve closes at 20 degrees after top-dead-center intake stroke. Line 407 represents the relationship between intake manifold pressure and engine air flow when the intake valve opens at 10 degrees before top-dead-center intake stroke and the exhaust valve closes at top-dead-center intake stroke. Thus, the intake manifold pressure and full load cylinder air charge can be affected by the choice of exhaust valve timing. The figure also illustrates that intake manifold pressure can be readily determined given an engine air flow.

Referring now to FIG. 4B, a plot that illustrates the effect of variable intake valve timing on intake manifold pressure and cylinder air charge is shown. The data were generated at 1500 RPM. The Y-axis represents intake manifold absolute pressure (MAP) in units of inches of mercury. The X-axis represents the engine air flow in grams per second. Line 421 represents the relationship between intake manifold pressure and engine air flow when the intake valve opens at 30 degrees after top-dead-center intake stroke and the exhaust valve closes at 20 degrees after top-dead-center intake stroke. Line 423 represents the relationship between intake manifold pressure and engine air flow when the intake valve opens at 20 degrees after top-dead-center intake stroke and the exhaust valve closes at 20 degrees after top-dead-center intake stroke. Line 425 represents the relationship between intake manifold pressure and engine air flow when the intake valve opens at 30 degrees before top-dead-center intake stroke and the exhaust valve closes at 20 degrees after top-dead-center intake stroke. Line 427 represents the relationship between intake manifold pressure and engine air flow when the intake valve opens at top-dead-center intake stroke and the exhaust valve closes at 20 degrees after top-dead-center intake stroke. Thus, the intake manifold pressure and full load cylinder air charge can be affected by the choice of intake valve timing.

As will be appreciated by one of ordinary skill in the art, the routines described in FIGS. 2-3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but it is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A computer readable non-transitory storage medium including stored data representing instructions executable by a computer to control an internal combustion engine of a vehicle, comprising:
  executable instructions for increasing an amount of overlap time between open intake valves and open exhaust valves of a cylinder in a first group of cylinders on a first cylinder bank in response to exhaust backpressure for a second group of cylinders on a second cylinder bank being greater than a predetermined pressure plus an offset with exhaust backpressure differences between cylinder banks, and in response to exhaust backpressure for the second group of cylinders being less than the predetermined pressure minus the offset, the second group of cylinders in communication with a turbocharger.

2. The computer readable non-transitory storage medium of claim 1, further comprising additional executable instructions for decreasing the amount of overlap time between open intake valves and open exhaust valves of said second group of cylinders.

3. The computer readable non-transitory storage medium of claim 1, further comprising additional executable instructions for adjusting waste gate or vane position of a turbocharger that is in communication with said first group of cylinders as said exhaust backpressure varies for said second group of cylinders.

4. The computer readable non-transitory storage medium of claim 1, further comprising additional executable instructions for adjusting spark timing of the first and second groups of cylinders in response to an exhaust pressure error.

5. The computer readable non-transitory storage medium of claim 1, further comprising additional executable instructions for adjusting a position of a throttle supplying air to the first and second groups of cylinders in response to exhaust pressure error.

6. A method for controlling an engine, comprising:
  increasing an amount of overlap time between open intake valves and open exhaust valves of a cylinder in a first group of cylinders on a first cylinder bank based on an exhaust backpressure of the first group of cylinders and further based on an increase in exhaust backpressure for a second group of cylinders on a second cylinder bank, the first and second groups of cylinders each in communication with separate turbochargers, and having cams that are positioned differently.

7. The method of claim 6, further comprising decreasing the amount of overlap time between open intake valves and open exhaust valves of the cylinder of the second group of cylinders.

8. The method of claim 6, further comprising adjusting a waste gate or vane position of the turbocharger that is in communication with the first group of cylinders as exhaust backpressure varies for the second group of cylinders.

9. The method of claim 6, further comprising adjusting spark timing of the first and second groups of cylinders in response to exhaust pressure error.

10. The method of claim 6, further comprising adjusting a position of a throttle supplying air to the first and second groups of cylinders in response to exhaust pressure error.

11. A method for controlling an engine, comprising:
reducing exhaust backpressure differences between cylinder banks by:
increasing a first cylinder group's overlap amount between open intake valves and open exhaust valves as a second cylinder group's exhaust backpressure increases, the first and second groups each on first and second cylinder banks and in communication with separate first and second turbochargers, respectively;
increasing a second cylinder group's overlap amount between open intake valves and open exhaust valves as a first cylinder group's exhaust backpressure increases; and
positioning cams of the first and second cylinder banks differently.

12. The method of claim 11, further comprising decreasing the first cylinder group's overlap amount as the second cylinder group's exhaust backpressure decreases, and decreasing the second cylinder group's overlap amount as the first cylinder group's exhaust backpressure decreases.

13. The method of claim 11, further comprising adjusting a waste gate or vane position of the first cylinder group's turbocharger as the second cylinder group's exhaust backpressure varies.

14. The method of claim 11, further comprising adjusting first and second cylinder groups' spark timing in response to an exhaust pressure error.

* * * * *